L. L. LAWRENCE & G. S. THOMAS.
Cultivator.
No. 160,210 — Patented Feb. 23, 1875.
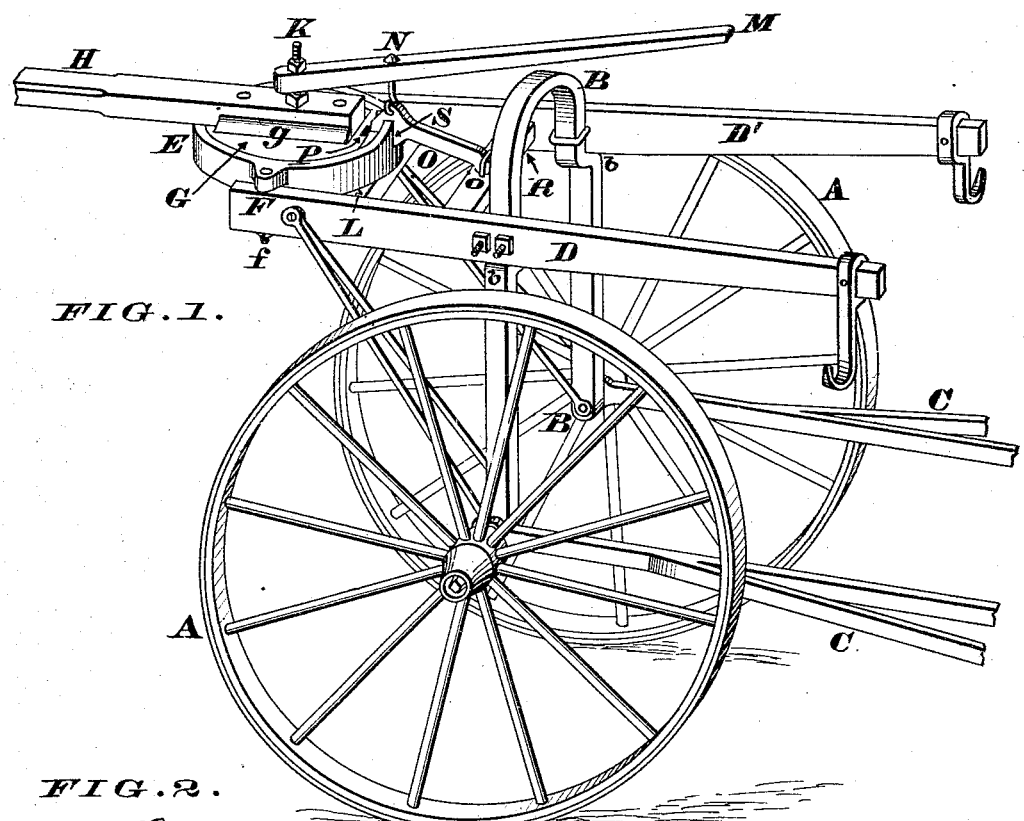
FIG. 1.
FIG. 2.
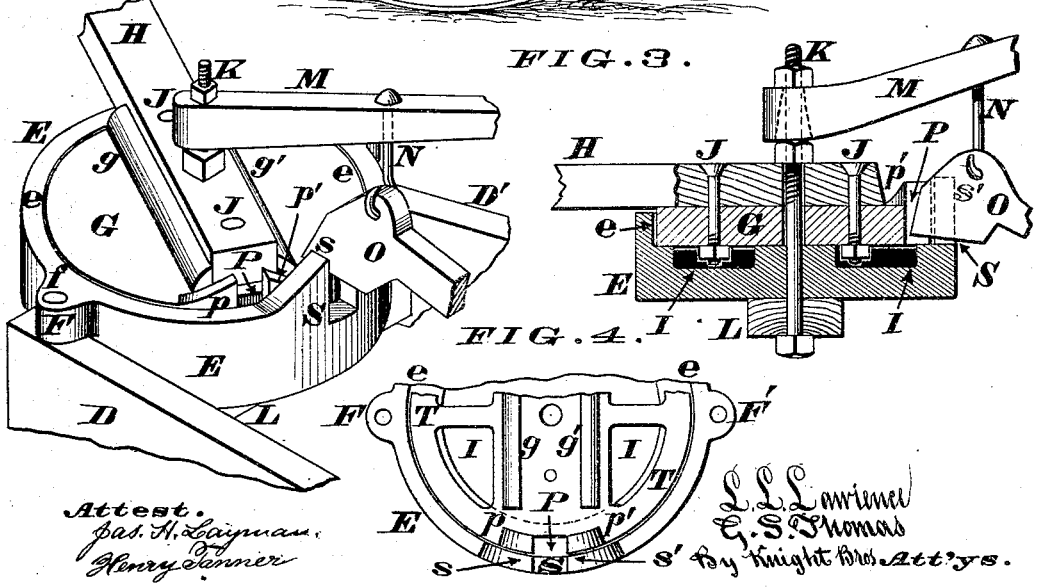
FIG. 3.
FIG. 4.
Attest:
Jas. H. Layman
Henry Tanner
L. L. Lawrence
G. S. Thomas
By Knight Bros. Att'ys

UNITED STATES PATENT OFFICE.

L. LOVELL LAWRENCE AND GEORGE S. THOMAS, OF DUBLIN, INDIANA, ASSIGNORS TO WAYNE AGRICULTURAL COMPANY, OF SAME PLACE.

IMPROVEMENT IN CULTIVATORS.

Specification forming part of Letters Patent No. 160,210, dated February 23, 1875; application filed January 2, 1875.

*To all whom it may concern:*

Be it known that we, L. LOVELL LAWRENCE and GEORGE S. THOMAS, both of Dublin, Wayne county, Indiana, have invented a new and useful Improvement in Cultivators, of which the following is a specification:

This is an improvement in those cultivators whose shares or teeth are supported at the proper elevation by means of a pair of wheels, whose axle is elevated at its middle portion for the purpose of straddling the row of corn or other crop undergoing cultivation; and our improvement comprises a peculiar arrangement of circular bed-plate, which is permanently connected to the axle or hounds, or other frame supported thereupon. Our improvement further comprises a tongue rigidly attached to a turn-table rotating horizontally on said plate when released by a lever under control of the operator, but becoming locked the instant the tongue resumes the longitudinal direction.

With the above arrangement, the tongue is stiff, except when released by the lever aforesaid. It then becomes, for the time being, a limber tongue, but limber as to horizontal movements only, being as to all other movements absolutely rigid.

In the accompanying drawing, Figure 1 is a perspective view of a cultivator embodying our improvement, the tongue being shown in its normal or locked condition. Fig. 2 is a perspective view of the turn-table and its accessories, the gravitating pawl or detent being elevated so as to unlock the tongue, which latter is swung around to the right side of the implement. Fig. 3 is a vertical section in the plane of the tongue, the turn-table being locked; and Fig. 4 is a half-plan of a modified form of turn-table.

Of the above illustrations, Figs. 2, 3, and 4 are drawn on an enlarged scale.

The wheels A, bent axle B, share-beams C, and frame or hounds D D' may be of any suitable and customary form. E is a cylindrical housing or bed-plate, having two lugs, F F', which are diametrically opposite each other, and said lugs are traversed by bolts $f$, which pass vertically through the hounds D D' near the forward ends of the same, and thus serve to secure said housing to the frame of the implement. This bed-plate is provided with a circular depression or pit, $e$, within which is seated a wheel, disk, or turn-table, G, consisting of a flat plate having two parallel flanges or ribs, $g\ g'$, upon its upper surface, between which flanges is secured the butt-end of tongue H. The housing is chambered out at I, so as to decrease its weight, and at the same time afford clearance for the nuts of bolts J, wherewith the tongue H is secured to the rotating disk G. This chambering of the housing diminishes the bearing-surface between the two members E and G, and reduces the friction accordingly. K is a pivot or king-bolt of the implement, which pivot passes through the housing, turn-table, and butt of tongue, and also through a transverse beam, L, which unites the forward ends of hounds D D'. The said bolt, being also prolonged above the tongue, serves as a fulcrum for a lever, M, connected by rod or link N to a gravitating-catch, O, which, entering a notch, P, in the aforesaid table, serves to maintain the tongue to a rigid longitudinal position. For this purpose the catch O is pivoted at $o$ in rear to cross-bar R of frame, while a notch, S, in the edge of the bed-plate serves to steady its forward portion, and to prevent lateral displacement. The notch or indentation P of the turn-table is flanked on either side by inclined planes $p\ p'$, which act to automatically elevate the free end of catch O whenever the tongue H is being turned either from the right or left to its normal or locked position. By this arrangement the catch is automatically engaged with the rotating disk, and without requiring any attention on the part of the driver of the implement. The notch S of housing is flanked by two upwardly-projecting spurs or stumps, $s\ s'$, which serve as guides to confine the free end of catch to a vertical path, while at the same time they increase the strength of said housing near the notch. The arched axle B is provided with offsets $b$, which form a rest and place of attachment for the frame D D'. The single tongue in front is so jointed to the double tongue or hounds as to be rigid vertically and limber horizontally.

The operation of our improvement is as follows: So long as the machine is proceeding in a straight, or nearly straight, course, the tongue is allowed to remain rigid; but should it be desired to turn sharply, either to the right or to the left, the operator has only to momentarily elevate the lever, which, liberating the tongue from horizontal rigidity, permits the team to turn without too abruptly turning the cultivator proper, which is thus left at liberty to be guided out of the row without injury to the crop. The instant that the tongue comes again into line with the body of the machine, the catch drops into its notch in the table, and automatically locks the tongue. While preferring a lever to operate the catch, we reserve the right to substitute a cord or other instrumentality.

It will be seen that the tongue H G and the bolt K, having their centers of vibration in a single vertical line, are at liberty to move independently and without interference one with the other.

In Figs. 1, 2, and 3 the turn-table is shown as a solid plate or casting; but it is evident that this member may take the shape of a perforated disk; or, if an open wheel or spider, as represented at T in Fig. 4, a single reach or pole may be substituted for the two hounds, if desired.

We claim as new and of our invention—

1. The described combination of bed-plate E, turn-table G, tongue H, bolt K, lever M, and catch O, for the purpose herein designated.

2. The tongue H, rigidly secured to the circular turn-table G, in combination with the drop catch O and lever M.

3. In a wheel-cultivator, the arched axle B, with the offsets $b$ and the frame D D', in combination with the pivoted tongue H, secured to the frame by the turn-table E G.

In testimony of which invention, we hereunto set our hands.

L. LOVELL LAWRENCE.
   GEORGE S. THOMAS.

Attest:
 GEO. H. KNIGHT,
 THOS. UNDERWOOD.